April 12, 1966   J. Y. STEEL   3,245,665
MAGNETIC MIXING BAR
Filed March 18, 1964
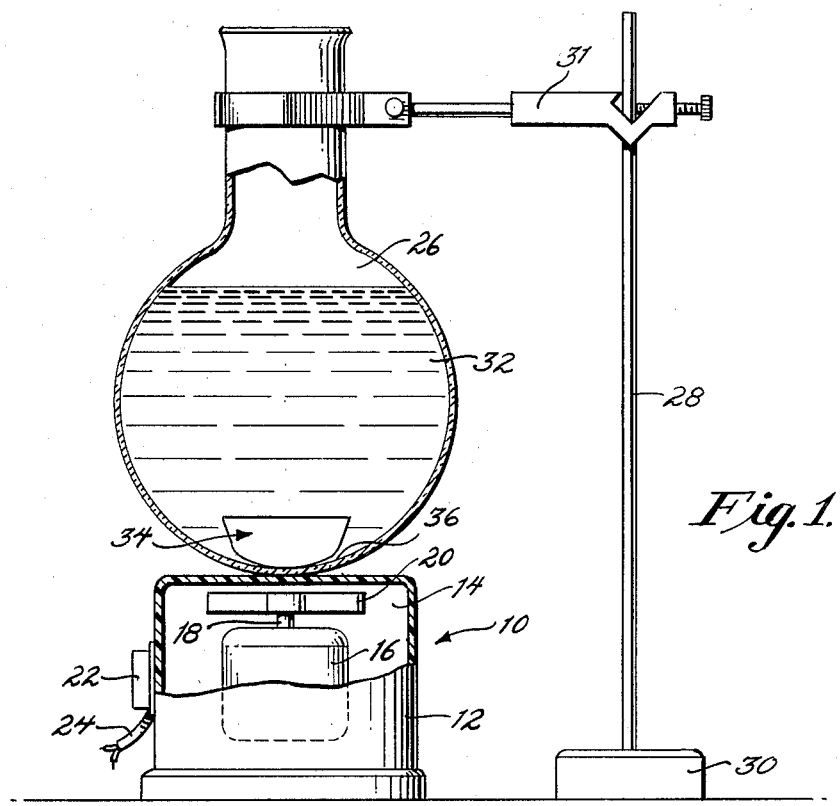
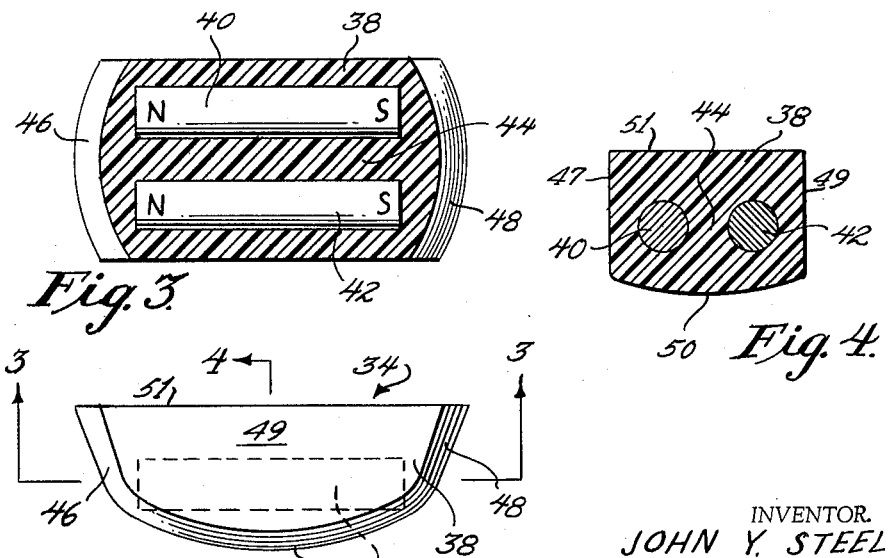
INVENTOR.
JOHN Y. STEEL
BY
Arthur H. Seidel
ATTORNEY.

United States Patent Office 3,245,665
Patented Apr. 12, 1966

3,245,665
MAGNETIC MIXING BAR
John Y. Steel, Abington, Pa., assignor to Arthur H. Thomas Company, Philadelphia, Pa., a corporation of Pennsylvania
Filed Mar. 18, 1964, Ser. No. 352,865
1 Claim. (Cl. 259—144)

This invention primarily relates to a mixing bar of the type which is adapted to be placed within a laboratory vessel for stirring liquids placed within said vessel.

In magnetic stirring apparatus, a vessel containing a liquid or other fluid material to be mixed is placed above a rotatably driven magnet, and a magnetized mixing bar is placed in the vessel. As the magnet is rotated, the mixing bar will tend to rotate about its own axis and follow the magnetic field set up by the rotatably driven magnet. The rotation of the mixing bar within the liquid contained in the laboratory vessel will agitate the liquid and cause the mixing thereof.

The prior art mixing bars have usually consisted of a permanent magnet embedded in a suitable encapsulating body. These devices have not been able to perform efficiently when the rotating magnet beneath the vessel was driven at high speeds. At high speeds, the prior art magnetic mixing bars would tend to lag the rotation of the magnetic field induced by the rotating bar magnet. That is, at high speeds, synchronization between the movement of the magnetic mixing bar and the rotating magnet was lost. This resulted in the mixing bar reversing its direction of rotation periodically whereby the periodic deceleration and acceleration of the mixing bar prevented adequate agitation of the fluid or liquid in the vessel. In some cases, the single magnet type of mixing bar would not even turn when the rotating magnet was being driven at high speeds.

I have discovered that by the use of two bar magnets positioned within an encapsulating body, I can overcome the foregoing difficulties noted with respect to the prior art. By the use of such a structure, I can effect complete synchronization between a magnetic bar within a liquid containing vessel and a rotatably driven magnet placed beneath the vessel regardless of the speed of rotation of the driven magnet. This will result in violent agitation of the liquid within the vessel when the mixing bar is driven at a high speed whereby the complete mixing of the liquid can be effected. Furthermore, I have discovered that the synchronization of the magnetic mixing bar and rotatably driven magnet may be effected regardless of the density of the liquid contained within the vessel.

Accordingly, it is the primary object of this invention to disclose a magnetic mixing bar which is capable of rotating in complete synchronization with a rotatably driven magnet regardless of the speed at which the magnet is driven whereby violent agitation of a liquid contained within a vessel in which the magnetic mixing bar is placed may be effected.

A further object of this invention is to provide a magnetic mixing bar of the character indicated which can effect violent agitation of even the most dense of liquids in which it is placed.

Still another object of this invention resides in the provision of a magnetic mixing bar which is capable of rotating about its own axis irrespective of the contour of the bottom wall of the containing vessel in which it is placed.

Other objects will appear from the disclosure which follows hereinafter.

For the purpose of illustrating the invention, there is shown in the drawings a form which is presently preferred; it being understood, however, that this invention is not limited to the precise arrangements and instrumentalities shown.

FIGURE 1 is a vertical sectional view, partly in elevation, of a magnetic stirring apparatus positioned beneath a vessel containing a liquid in which a magnetic mixing bar constructed in accordance with the principles of the present invention is positioned.

FIGURE 2 is a side elevational view of the magnetic mixing bar constructed in accordance with the principles of the present invention.

FIGURE 3 is a cross sectional view taken substantially along the plane indicated by the lines 3—3 of FIGURE 2.

FIGURE 4 is a cross sectional view taken substantially along the plane indicated by the line 4—4 of FIGURE 2.

Referring now to the drawing in detail, the magnetic stirring apparatus generally designated by the numeral 10 comprises a housing 12 defining a motor compartment 14. Mounted within the compartment 14 is a motor 16 having a shaft 18 equipped adjacent one end thereof with a permanent bar magnet 20. The motor circuit will usually include a speed control device such as 22 which may be a suitable electrical element connected in the lead line 24. The lead line 24 may be equipped at its outer end with a plug which can be connected to a convenient source of electrical energy. The magnetic stirring device 10 is conventional in the art and is fully disclosed in Patent 2,951,689 to H. L. Asp et al.

A suitable laboratory vessel such as a flask 26 is supported above the magnetic stirring apparatus 10. The flask 26 may be supported by a suitable laboratory apparatus such as a standard 28 supported by a base 30. A conventional clamp such as 31 is used to hold the flask at a suitable vertical position with respect to the standard 28 so that the magnetic stirring apparatus 10 may be positioned therebeneath.

The flask 26 contains a volume of a liquid 32 which is to be mixed. A magnetic mixing bar 34 constructed in accordance with the principles of the present invention is placed within the flask 26 adjacent the rounded bottom 36 thereof.

With specific reference to FIGURES 2–4, the magnetic mixing bar 34 comprises an encapsulating body 38 formed of corrosion resistant plastic material or the like. Embedded within the encapsulating body 38 are a pair of permanent magnets 40 and 42. The magnets 40 and 42 are embedded within the encapsulating body with their longitudinal axes below the center of gravity thereof. The magnets 40 and 42 may be of any suitable cross section but are oriented so that they are spaced by a portion of the encapsulating body 44 with their similar poles opposing each other. As is evidenced from FIGURE 3, the north pole of one magnet is adjacent the north pole of the other. The portion 44 of the encapsulating body maintains the spacing of the magnets 40 and 42 and since the magnets are surrounded by the remaining portions of the encapsulating body, relative movement of the magnets by repulsion of like poles is prevented. The ends 46 and 48 of the encapsulating body 38 are tapered and are connected by a convex bottom such as 50. Flat sides 47 and 49 extend from the convex bottom 50 to a flat top 51. This is clearly shown in FIGURE 2.

Due to the convex nature of the bottom 50 of the encapsulating body 38, point contact of the magnetic mixing bar 34 is provided between the bottom of the vessel 36 and the bar 34. This is so on even the most rounded bottoms such as are usually associated with flasks such as 26. This provides for a minimum of frictional contact between the magnetic mixing bar 34 and the bottom of the flask 36 to enhance the relative rotation of the mixing bar with respect to the flask by decreasing any impedance to the rotation of the bar.

I have discovered that by forming a magnetic mixing bar with a pair of permanent magnets embedded therein, that the speed of rotation of the magnetic mixing bar will be in complete synchronization with the rotation of the driven rotating magnet 20 regardless of the speed of which said latter magnet is driven. Therefore, I can cause violent agitation of the liquid 32 since there will be complete synchronization of rotation of the mixing bar 34 and the magnet 20 at high speeds. The mixing bar will rotate about its own vertical axis in one direction, will remain stable and under the influence and control of the rotating magnet 20 at all times.

The encapsulating body 38 is preferably formed of corrosion resistant plastic material. This is to prevent any chemical reaction between the mixing bar and the liquid within the vessel and to render the mixing bar capable of long standing use. The encapsulating body may be formed, for example, of a polymeric plastic material such as polyvinyl chloride or Teflon.

I have also discovered that the synchronization of the magnetic mixing bar 34 and the rotation of the magnetic 20 may be effected regardless of the density of the liquid being mixed as long as I provide two permanent magnets in the encapsulating body as I have disclosed in this application.

My mixing bar will be under control at all times whereby the mixing of the liquid contained within a laboratory vessel may be effected to any degree.

The present invention may be embodied in other specific forms without departing from the spirit or essential attributes thereof and, accordingly, reference should be made to the appended claim, rather than to the foregoing specification as indicating the scope of the invention.

I claim:

A mixing bar for use with magnetic mixers comprising a pair of magnets and an encapsulating body formed of polymeric plastic material enclosing the same, said magnets being permanent magnets oriented in said encapsulating body with their similar poles relatively adjacent each other so that said similar poles oppose each other, means in said encapsulating body for maintaining said magnets in spaced relation, said encapsulating body having a convex bottom, a flat top, and flat sides, said sides extending continuously upwardly from said bottom to said top, said magnets being of generally elongated shape and having their longitudinal axes below the center of gravity of said encapsulating body.

References Cited by the Examiner
UNITED STATES PATENTS

| | | |
|---|---|---|
| 2,518,758 | 8/1950 | Cook. |
| 2,655,011 | 10/1953 | Ihle et al. |
| 2,844,363 | 7/1958 | Clark _____ 259—144 |

WILLIAM I. PRICE, *Primary Examiner.*